UNITED STATES PATENT OFFICE.

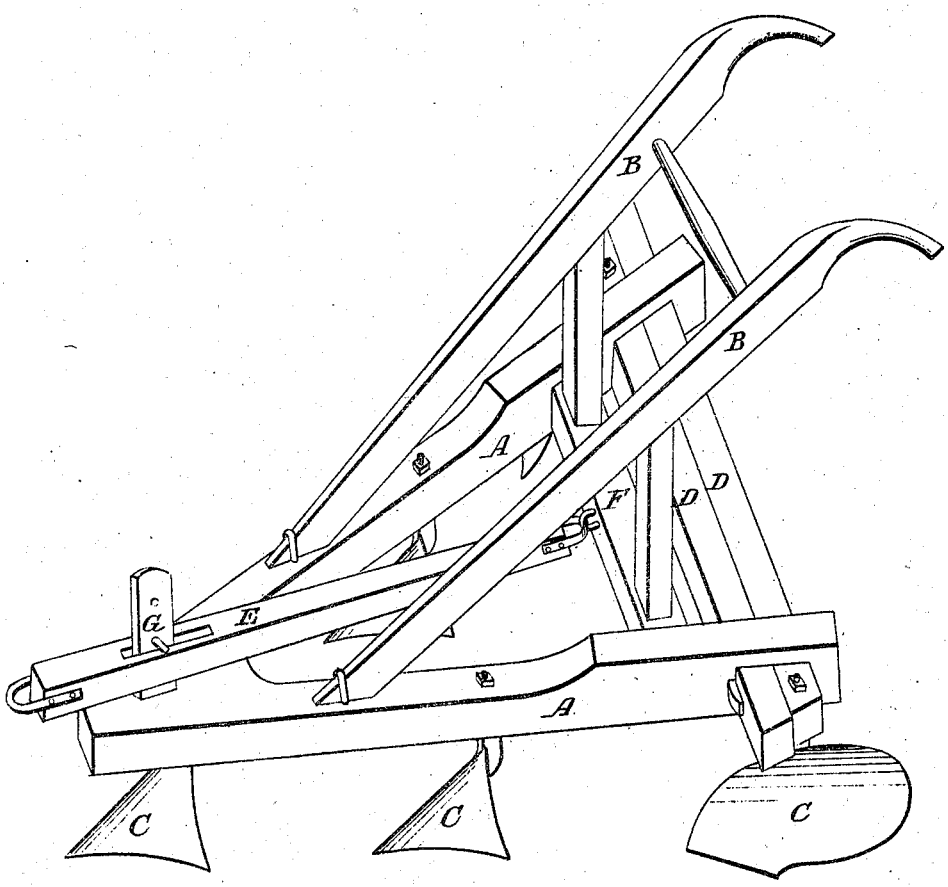

MARSHALL J. HUNT, OF CINCINNATI, OHIO.

IMPROVEMENT IN CULTIVATING-PLOWS.

Specification forming part of Letters Patent No. 2,792, dated September 30, 1842.

*To all whom it may concern:*

Be it known that I, MARSHALL J. HUNT, of Cincinnati, in the county of Hamilton and State of Ohio, have invented certain new and useful Improvements in Agricultural Instruments Denominated "Cultivators," which improved instrument I call the "Corn and Cotton Plow and Cultivator;" and I do hereby declare that the following is a full and exact description thereof.

In my corn and cotton plow and cultivator I use three cultivator-teeth, which are affixed permanently to the frame by wedges or screw-nuts, and two teeth or mold-boards, which are attached to two sliding bars passing through a mortise at the rear end of the frame, which bars are retained in place by wedges, or otherwise, so as to admit of the placing of the teeth or of the mold-boards which are attached to them at such a distance apart as shall adapt them to the rows of corn, cotton, or other article under cultivation, and which admit, also, of the shifting of the mold-board, so as to turn the earth either outward or inward against the plant. I also make the drawing-bar or tongue, to which the horse is attached, to rise or fall in such manner as to determine the depth to which the cultivator-teeth shall enter the ground.

In the accompanying drawing I have given a perspective representation of my improved cultivator and plow.

A A are the sides of the frame, and B B the handles, which are similar to such as have been before known and used.

C C C are the three permanent teeth, to which any of the usual forms may be given, as may be preferred.

D D are two sliding bars. which pass through mortises in the sides A A of the cultivator, each of them carrying at its outer end a tooth or a mold-board, as the nature of the case may require, which teeth or mold-boards, may be placed at any desired distance apart, and are to be held in place by wedges or screws acting upon the sliding bars.

E is the drawing-bar or tongue, to which a single-tree is to be attached. This bar is fastened by a staple to the cross-piece F of the frame, and near its fore end has a mortise through it, which passes over an upright piece, G, fixed to the frame, and having holes through it admitting of a bolt or bolts to set the tongue at any required height.

This instrument may be varied in size; but those which I have used have been from four to five feet in length, and the frame at the rear end about two feet and a half wide. The teeth which I have used spread out about six inches wide at the bottom, and are about six inches deep. The mold-boards I have made about fifteen inches long and from six to nine inches wide. All this, however, may be varied according to the nature of the soil or the judgment of the user.

My general mode of proceeding is to use the five cultivator-teeth until the corn or other vegetable requires plowing or hilling. I then remove the cultivator-teeth from the sliding bars and replace them by two mold-boards, setting the bars so that the mold-boards shall stand at the desired width apart and reversing the faces of said mold-boards and their distance apart, so as to plow alternately within and without the respective rows.

Having thus fully described the nature of my improvements in the corn and cotton plow and cultivator and shown the manner in which the same operates, what I claim therein as new, and desire to secure by Letters Patent, is—

The employment of two sliding bars, carrying two cultivator-teeth or two mold-boards, which may be shifted and set in the manner and for the purpose set forth.

MARSHALL J. HUNT.

Witnesses:
 JNO. P. CUNNINGHAM,
 BRIGHAM FARLOW.